Dec. 27, 1938. W. L. CASTLE ET AL 2,141,736
OFFSET DIE
Filed July 6, 1937 2 Sheets-Sheet 1
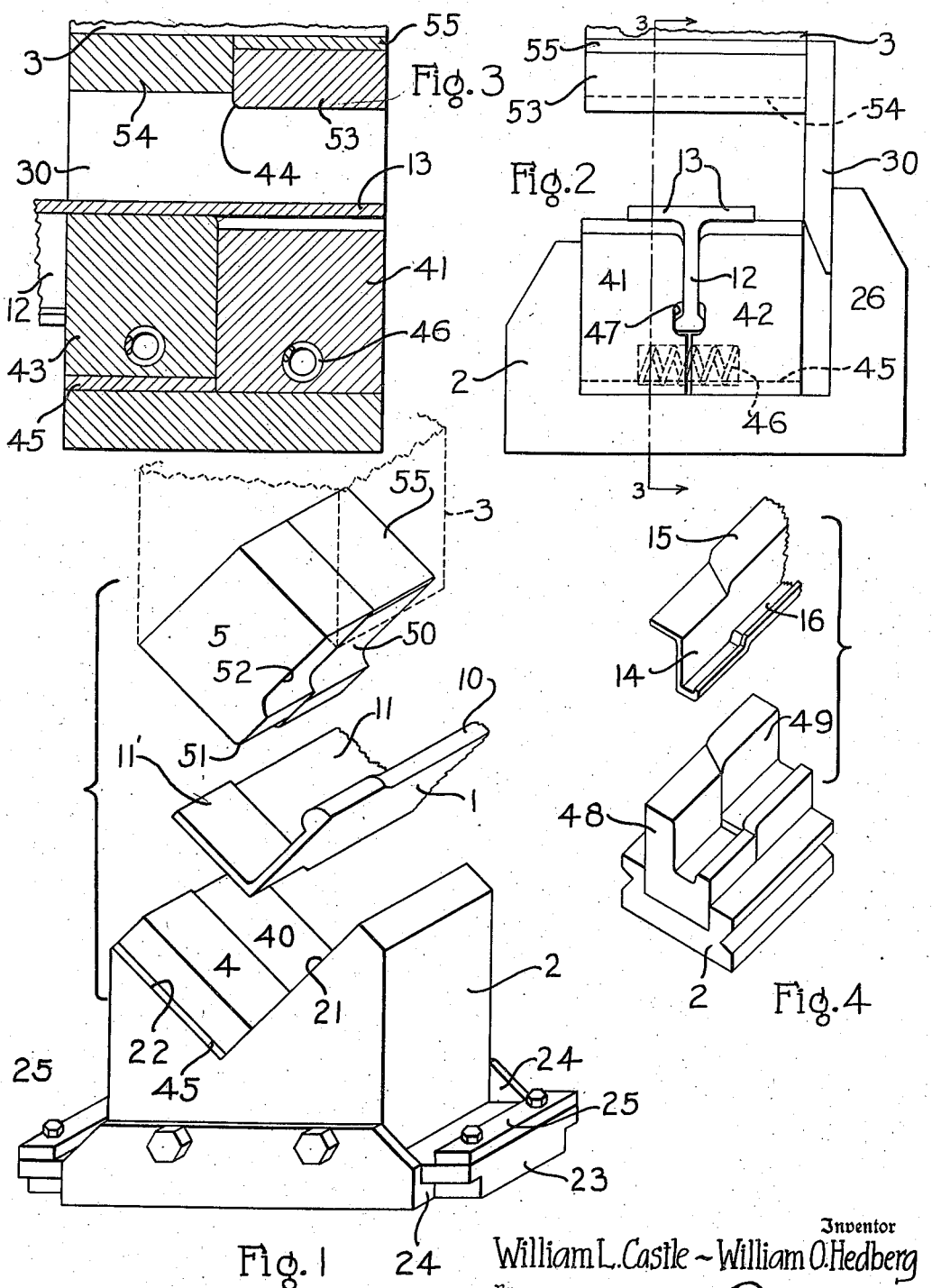
Inventor
William L. Castle ~ William O. Hedberg
By Charles L. Reynolds
Attorney

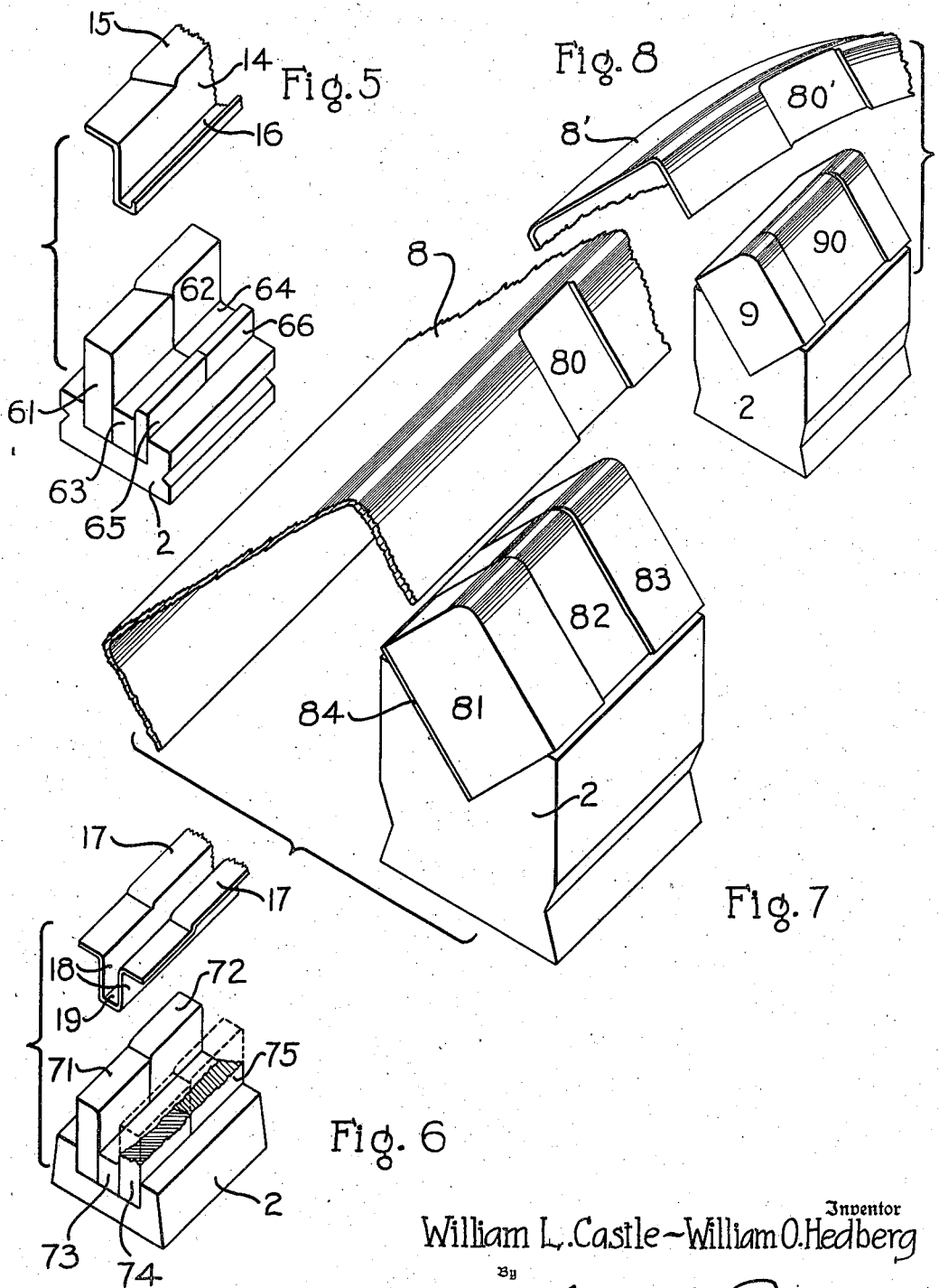

Patented Dec. 27, 1938

2,141,736

UNITED STATES PATENT OFFICE 2,141,736

OFFSET DIE

William L. Castle and William O. Hedberg, Seattle, Wash., assignors to Boeing Aircraft Company, Seattle, Wash., a corporation of Washington Application July 6, 1937, Serial No. 152,174

7 Claims. (Cl. 153—21)

Our invention relates to offsetting operations, usually of structural shapes, and finds its greatest application in the manufacture of aircraft or like constructions wherein shapes of various forms are made of aluminum alloys, these shapes being bent or otherwise formed from sheet material, or extruded sections. The invention is primarily intended for the offsetting of such shapes, or at least flange portions thereof, to overlie the flanges of other shapes with which they cross or to which their ends are to be connected, or to overlie the overlap of material, in a skin, for instance.

Such offsetting occurs at many points in airplane construction, with various kinds of shapes and at various angles and depth of offset. Also many such shapes, while generally similar, vary in certain particulars, such as the depth of a bulb flange. It has heretofore been considered necessary to effect the offsetting by hand methods, or in lieu thereof to form a unitary punch part and a unitary die part, complemental thereto, which would effect the offsetting. Such die parts could in general be used only for a given size and shape of structural parts, and, of course, for only a given angle and a given depth of offset, with the result that many such punches and dies had to be made for even small variations, and this greatly increased the expense, both as to labor and materials in their manufacture, and as to cataloging and storing of these numerous dies. The manual offsetting was slow, performed by skilled labor, and for both reasons costly, and frequently resulted in distortion of webs which are not intended to be offset or distorted, and in the imperfect or inaccurate offsetting of the flange parts. It is, then, undesirable to offset by hand, but equally undesirable and uneconomical to offset by dies, made according to methods heretofore known. The desideratum is a die, for accuracy and speed, that is adaptable to various shapes, and hence usable in many different places, for economy.

It is an object of the present invention to provide means whereby such offsetting operations can be performed mechanically, accurately and quickly, whereby a given set of dies may be used for various sizes of any given shape, or even for somewhat different shapes, and for any thickness of offset desired, and can thus perform many offsetting operations at greatly reduced cost, with far greater accuracy, and in a fraction of the time heretofore required, taking into account the time required to make up special dies and punches. It is also an object to lessen the number of punches and dies required, and to avoid the necessity of storing these, by building up or assembling the punches and dies from a small number of standard punch and die blocks, which can be set together in any desired pattern to form a composite die; in which the depth of the offset desired is automatically fixed and determined without any need of special accuracy on the part of the workman; which punch and die blocks and their holders can be disassembled when no longer required for the job in hand, and reassembled later for duplication of this job or reassembled in other relationships to perform other jobs; and by which the storing of special dies is superseded by mere directions on the blue prints as to what standard or special dies to use, and how to assemble them.

It is a further object to provide means for accomplishing such offsetting operations which will prevent distortion of the webs of structural shapes, and which will produce a better grain in the metal, to the end that the offset shape is not weakened by the offsetting operation.

With these and other objects in view, as will appear hereafter, the present invention comprises the novel means for offsetting structural shapes, as disclosed in the accompanying drawings in various arrangements, and the principles of which will be explained in this specification and more particularly pointed out and defined in the claims which terminate the same.

In the accompanying drawings we have illustrated how the principles of our invention may be applied in the performance of varied offsetting operations, and while the operations illustrated are all of structural shapes, and our invention is best adapted to the offsetting of such structural shapes, certain of the principles thereof may with advantage be incorporated in punches and dies for offsetting flat material or material other than structural shapes, and we do not desire to be limited except as is required by the terminology of the claims. The term "shapes" as herein used is intended to include any structural element which is other than of flat shape, for instance being bent into angular shape or extruded of angular shape.

Figure 1 is an isometric view of a complemental punch and die and the offset work performed thereby.

Figure 2 is an end view of our invention embodied in a different type of die, and Figure 3 is a section through the same, substantially on the line 3—3 of Figure 2.

Figure 4 is an isometric view of a die for performing a different type of offsetting operation, and of the work which has been offset thereby.

Figure 5 is a view similar to Figure 4, but illustrating a modification of the offsetting operation.

Figure 6 is a view similar to Figures 4 and 5, showing a further modification of the die.

Figure 7 is an isometric view of a die and of the work offset thereby, illustrating a differently located offset, and Figure 8, is a similar view showing the same type of operation performed upon a somewhat differently shaped structural member.

The offsetting operation illustrated in Figure 1 is performed upon a bulb angle, the web 1 of which, with its bulb 10, is not particularly required to be offset, but the flange 11 of which is to be offset at its end, as illustrated at 11'. Inevitably if the flange is to be offset, there must be some offsetting of the web, but this need not extend to the free edge of the web, though in most cases, because of the comparatively narrow web, the offsetting will to some extent extend to the free edge of the web and is so shown in Figure 1. This offsetting of the web has heretofore produced undesirable grain structure in the web, but by the dies herein disclosed this grain structure is considerably improved, and the web is thereby made stronger.

To perform this operation we employ a die holder 2, which in this particular instance is provided with two angled faces 21 and 22, the angle of these faces corresponding to the angle between the web 1 and flange 11 of the work. Resting upon one of these faces are two die blocks 4 and 40. These blocks are of equal height and like cross section, so that their upper faces are parallel to the face 22 upon which they rest. A punch holder 3 is employed, and upon this are mounted two blocks 5 and 50, which are complemental to the respective blocks 4 and 40, and which are formed to fit into the upper side of the structural angle which is to be offset. In other words, these blocks 5 and 50 are formed at their angle 51 with a radius equal to the radius of the shape to be offset, and with faces generally shaped to engage the inner faces of the work. By relieving one face of these blocks, as indicated at 52, they may be made to fit bulb angles of considerable variation in height of the web. As noted, the block 5 is positioned so that it will register only with the block 4, and the block 50 will register only with the block 40. At their adjoining edges these blocks 4, 40 and 5, 50 may be formed with appropriate radii which, due to the scale of the drawings, it is not practicable to show.

In order to raise one block above another there is interposed between the surface 22 of the die holder 2 and the block to be raised, for instance the block 4, a shim 45 which is of the thickness of the offset desired, and a similar shim of like thickness, indicated at 55, is interposed between the punch block 50 and the punch holder 3. Thus of the complemental blocks 4 and 5 one is raised by a shim, and of the complemental blocks 40 and 50 that one, 50, is raised which is complemental to the unraised block 40. Thus the several blocks will effect an offsetting action when the punch and die approach each other, with the work between them.

The die and punch blocks are normally secured by screws (not shown) to their respective holders, the shims being apertured for such screws. However, were the die holder 2 and punch holder 3 both to be rigidly secured to the corresponding press parts (not shown) there would be a tendency upon contact of the punch with the work to effect some rotational distortion of the web and flange of the shape, and this might not be straightened out again by a full contact. To avoid this and to permit the device, in the form shown in Figure 1, to be self-positioning we prefer that of the die holder 2 and punch holder 3 one be made floating. Thus the die holder 2 rests upon a shoe 23, and is guided by the gibs 24 for transverse movement, being prevented from sliding too far by the stop bars 25. Entrance of the protruding angled blocks 5, 50 into the reentrant angle between 21 and 4, 40, with the work interposed, will exactly position all parts, by the sidewise yielding of the die.

In Figure 3 the offsetting operation is to be performed upon the two flanges of a T-bulb, the web of which is shown at 12 and the flanges at 13. In this arrangement four blocks are employed to make up the die, the blocks 41 and 42 constituting a pair and being disposed side by side, and the pairs being arranged end to end, as the block 41 and a block 43. A block paired with the block 43 is not shown, but is placed end to end with block 42. In this view the radius at 44 is shown, this constituting the radius of the offset. Each of the die blocks is relieved at its inner face, and as indicated at 47, to receive the bulb of the shape to be offset. Preferably springs 46 are employed, to tend to hold the blocks somewhat apart for ready insertion of the web between them.

The punch element might be made up of four such blocks, but since the shape is to be offset entirely across it is preferable to employ two punch blocks 53 and 54, the block 53 being complemental to the paired blocks 41 and 42, and the block 54 being complemental to the block 43 and its paired block. Shims 55 and 45 are located as before. The several die blocks are mounted upon and secured in any suitable way to the die holder 2, and preferably this die holder has an upstanding flange 26. Similarly the punch holder 3 has a depending flange 30 which enters as a wedge between the flange 26 and the outer face of one of the punch blocks of each pair, as the block 42 shown in Figure 2. In so doing it crowds these blocks toward the paired blocks, in opposition to the springs 46, thereby clamping the web 12 of the shape between the paired blocks, as 41 and 42. This grips and holds the web firmly, and when the final offsetting operation occurs upon ultimate approach of the punch to the die, the web, being firmly clamped, is permitted to offset but slightly if at all at its free edge, and in thus confining the offsetting largely to the portion adjacent the flange the grain of the metal is found to be considerably better than when the web is not thus gripped, and the strength of the offset part is greater.

In Figure 4 the element to be offset is in general a Z-shape, and is formed with a web 14, a flange 15, and another flange 16, and it is to be offset in both flanges, but along an angle in the flange 15 and straight across in the flange 16. This requires the formation of special die blocks and punch blocks, as illustrated by the die blocks 48 and 49, shaped generally to correspond to the shape of the work, and of the angles of the offset, and one of them, as the block 49, being raised by a shim (not shown) between it and the die holder 2. While the die blocks and the punch blocks are specially formed, they can be removed from the die holder 2 and the latter used with various shapes of dies.

Such a die as shown in Figure 4 may be made up of a greater number of blocks, as shown in Figure 5. Here the flange 15 is to be offset upon an angle, but the flange 16 is not to be offset. The die member is formed in this instance of six blocks 61, 62, 63, 64, 65 and 66, all assembled in a single die holder 2. The blocks 61 and 62, the blocks 63 and 64, and the blocks 65 and 66 are all of equal height, that is, the two similar blocks are of equal height, but beneath the block 62 a shim is placed of the thickness of the offset desired, and this effects offsetting of the flange 15, but since the equal height blocks 63 and 64 have no shim beneath either of them, nor have the blocks 65 and 66 of equal height, no offsetting in this portion of the work occurs. It will be understood, of course, that in the punch the block which is complemental to the block 61 has a shim interposed between it and the punch holder.

In Figure 6 a somewhat similar arrangement is shown except that here it is desired to offset the two flanges 17 of a flanged channel, but not to offset the webs 18 nor the flange 19. Accordingly blocks 71, 72, 73, 74 and 75 are provided, all assembled in a die holder 2, the blocks 72 and 75 being shimmed to stand above the level of the corresponding blocks 71 and 74, but the block 73 is continuous, and simply supports the bottom flange 19.

Such offsetting can also be accomplished intermediate the ends of a shape, as illustrated in Figure 7. Here it is desired to offset one flange of a channel 8 between its ends, and the die is formed of the blocks 81, 82 and 83, received in the reentrant angle of a die holder 2, the blocks 81 and 83 having shims 84 beneath them and the block 82 having no shim beneath it. A complementally formed punch member would be employed, and with the work in position the offsetting can be accomplished as shown at 80 between the ends of the work piece 8. It is immaterial whether the work piece be straight or curved, and curved shapes are often employed in airplane construction. Such a curved shape is shown in Figure 8 at 8', with the offset formed at 80'. In this instance the die holder 2, which can be used for many purposes and with many combinations of blocks, may support a single block 9, having between its ends a milled groove 90 of a shape to form the offset 8 when operated upon by a complemental punch element. It will be noted here that the block 9 is of a length but little greater than the length of the groove 90, and it is this which makes it difficult to form such a block of a plurality of assembled or composite blocks, because the block must not engage the curved channel at points spaced widely apart or far beyond the ends of the offset 80, or else there would not be adequate support at the edges of the channel or offset 80'.

What we claim as our invention is:

1. Means for offsetting structural shapes comprising, in combination, a die holder and a punch holder, each having a continuous coplanar die or punch seating surface, two die blocks seated upon said die holder's surface in end-to-end relationship, with their adjoining ends formed to the angle and radius of offset desired, a shim disposed between the die holder surface and one block, of the thickness of the offset desired, two punch blocks, each shaped and positioned complementally to one of the die blocks, mounted and seated upon said punch holder's surface, and a shim of the thickness of the offset desired disposed between the punch holder surface and that punch block which is complemental to the unshimmed die block.

2. Means for offsetting structural shapes comprising, in combination, a die holder and a punch holder, each having a die or punch seating surface which is coplanar throughout, a plurality of die blocks shaped generally to correspond to the shape of the part to be offset, and of equal height, mounted upon the die holder's surface in end-to-end relation, a similar member of complemental punch blocks of equal height similarly disposed and mounted upon the punch holder's surface to register each with only its complemental die block, a shim of the thickness of the offset desired interposed between one such die block and the die holder's surface, to elevate this block above the level of the adjoining die block, and a shim of the thickness of the offset desired interposed between the punch holder's surface and the punch block which is complemental to such adjoining die block, to elevate such punch block above the level of that punch block which is complemental to the elevated die block.

3. Means for offsetting flanged structural shapes comprising, in combination, a die holder and a punch holder, each having a continuous coplanar seating surface, two pairs of die blocks all of equal height, mounted upon the die holder's seating surface side by side in the pairs, and the pairs end to end, and shaped generally to receive the web of the shape between the blocks of pairs, and to engage its flange or flanges with the upper faces of the several blocks, two punch blocks complemental each to one pair of said die blocks, both of equal height, mounted upon the punch holder's seating surface end to end, whereby each punch block registers only with its complemental pair of die blocks, a shim of the thickness of the offset desired in contact with a seating surface and interposed between the punch holder and that punch block which is to engage the portion of the shape to be offset, a shim of like thickness in contact with the other seating surface and interposed between the die holder and those die blocks which adjoin, end to end, the pair of die blocks complemental to the offsetting punch block, and means to press the pairs of die blocks together, to clamp the interposed web of the shape, during approach of the punch holder to the die holder in offsetting the flange or flanges.

4. Means for offsetting flanged structural shapes comprising, in combination, a die holder, and a punch holder having a depending flange, two pairs of die blocks all of equal height, mounted upon the die holder side by side in the pairs, and the pairs end to end, and shaped generally to receive the web of the shape between the blocks of pairs, and to engage with their upper surfaces the flange or flanges of the shape, two punch blocks complemental each to one pair of said die blocks, all of equal height, mounted upon the punch holder end to end, whereby each punch block registers only with its complemental pair of die blocks, a shim of the thickness of the offset desired interposed between the punch holder and that punch block which is to engage the portion of the shape to be offset, a shim interposed between the die holder and those die blocks which adjoin, end to end, the pair of die blocks complemental to the offsetting punch block, the depending flange of the punch holder engaging the outer side of a die block of each pair, upon approach of the punch to the die, and the paired die blocks being securely held, whereby to press the die blocks of each pair together to clamp the interposed web of the shape during offsetting of its flange or flanges.

5. Means for offsetting angled shapes comprising, in combination, a die holder and a punch holder, one of which is formed with continuous coplanar seating surfaces defining a reentrant angle facing the other, and of a shape corresponding, in general, to the shape to be offset, a plurality of blocks of equal height, and like cross section, seated end to end in the angle of said angled holder, a plurality of blocks each complemental to one of the first mentioned blocks, seated end to end in the other holder, and having a protruding angle adapted to fit generally within the reentrant angle formed by such first blocks and their holder, a shim of the thickness of the offset desired interposed between one of the first-mentioned blocks and its seat on the holder, to raise it above the level of the adjoining block, and a shim of like thickness interposed between the seat on the second holder and the block thereon which adjoins that block which is complemental to the raised block.

6. Means for offsetting angled shapes comprising, in combination, a die holder and a punch holder, one of which is formed with a continuous coplanar seating surface defining a reentrant angle facing the other, and of a shape corresponding, in general, to the shape to be offset, a plurality of blocks of equal height, and like cross-section, mounted end to end in the angle of said angled holder, a plurality of blocks each complemental to one of the first-mentioned blocks, seated end to end in the other holder, and having a protruding angle adapted to fit generally within the reentrant angle formed by such first blocks and their holder, a shim of the material to be offset disposed in contact with a seating surface, and interposed between one of the first-mentioned blocks and its holder, to raise it above the level of the adjoining block, a shim of the material to be offset disposed in contact with the other seating surface, and interposed between the second holder and the block thereon which adjoins that block which is complemental to the raised block, a shoe adapted to be fixed in the press, and means guiding one of the angled members for sidewise movement relative to the shoe, to precisely position the two angled members relative to each other during the offsetting operation.

7. Means for offsetting material, especially relatively soft metal elements, comprising in combination a punch and a die having, when assembled, complemental raised and low areas, and including appropriate holders, of which punch and die holders at least one is formed with a seating surface lying in one plane throughout, and the punch or die received in such holder is formed of a plurality of blocks of equal height in all corresponding parts and with plane seating surfaces adapted to seat on the planar seating surface of its holder, with the abutting seating surfaces in contact substantially throughout their entire area, that block which is to offset the work having a shim of the material which is to be offset, and of the thickness of the desired offset, interposed between it and its holder's seating surface, in contact with the seating surfaces of both block and holder substantially throughout its entire area, to raise such block above the level of the remaining blocks, and thereby to constitute the raised area.

WILLIAM L. CASTLE.
WILLIAM O. HEDBERG.